United States Patent [19]
Thiele

[11] Patent Number: 5,921,597
[45] Date of Patent: Jul. 13, 1999

[54] DEVICE FOR MANUALLY MOVING SECTIONS AND SHEET METAL

[75] Inventor: Alfred Thiele, Iserlohn, Germany

[73] Assignee: Kettenwerke Schlieper GmbH, Iserlohn, Germany

[21] Appl. No.: 08/907,832

[22] Filed: Aug. 14, 1997

[51] Int. Cl.⁶ .................................................. B65G 7/12
[52] U.S. Cl. ............................ 294/17; 254/131; 294/16; 294/92
[58] Field of Search .............................. 294/4, 11, 15–17, 294/19.1, 26, 92, 103.1, 104, 106; 254/44, 113, 119–121, 129, 131

[56] References Cited

U.S. PATENT DOCUMENTS

| | | | |
|---|---|---|---|
| 1,205,852 | 11/1916 | Buehler .................................... | 294/15 X |
| 1,551,390 | 8/1925 | Haymaker et al. ....................... | 294/15 |
| 1,824,906 | 9/1931 | Leach et al. ............................. | 294/17 |
| 2,132,553 | 10/1938 | Andrejchak .............................. | 294/17 |
| 2,788,237 | 4/1957 | Misiura ..................................... | 294/17 |
| 2,967,730 | 1/1961 | Vann ........................................ | 294/92 X |
| 3,788,690 | 1/1974 | Gelles et al. ............................. | 294/17 |

FOREIGN PATENT DOCUMENTS 4429631  3/1996  Germany .

*Primary Examiner*—Johnny D. Cherry
*Attorney, Agent, or Firm*—Friederich Kueffner

[57] ABSTRACT

A device for manually moving or displacing sections or sheet metal includes at least one hand lever which has at one end a handle and at the other end a gripping arm connected in an articulated joint to the hand lever so as to be capable of swivelling about a transverse axis. The hand lever further has an abutment located opposite the gripping arm. Frictionally engaging tensioning elements for limiting the free swivelling capability of the gripping arm relative to the hand lever are integrated in the articulated joint between the gripping and the hand lever.

1 Claim, 5 Drawing Sheets

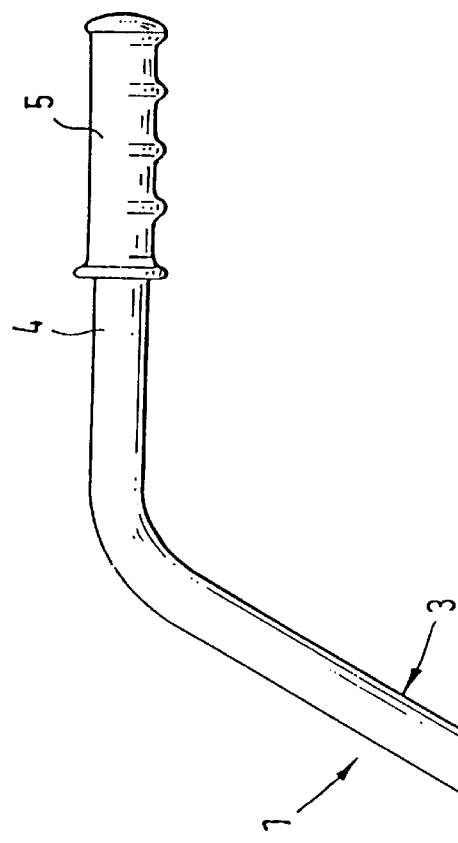
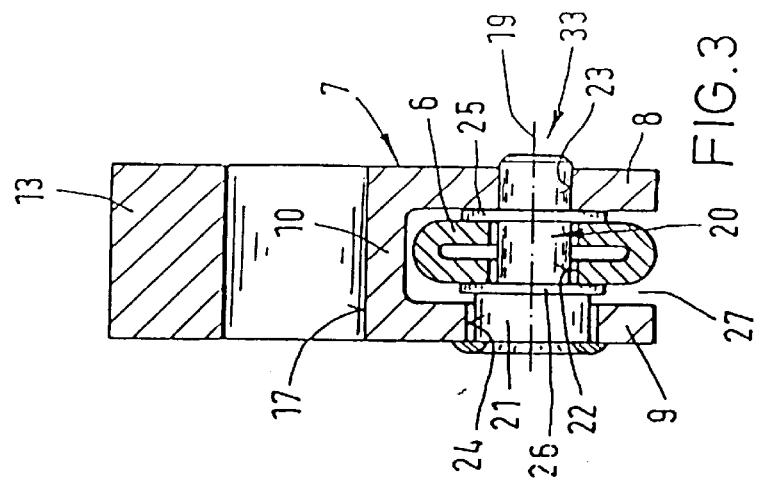
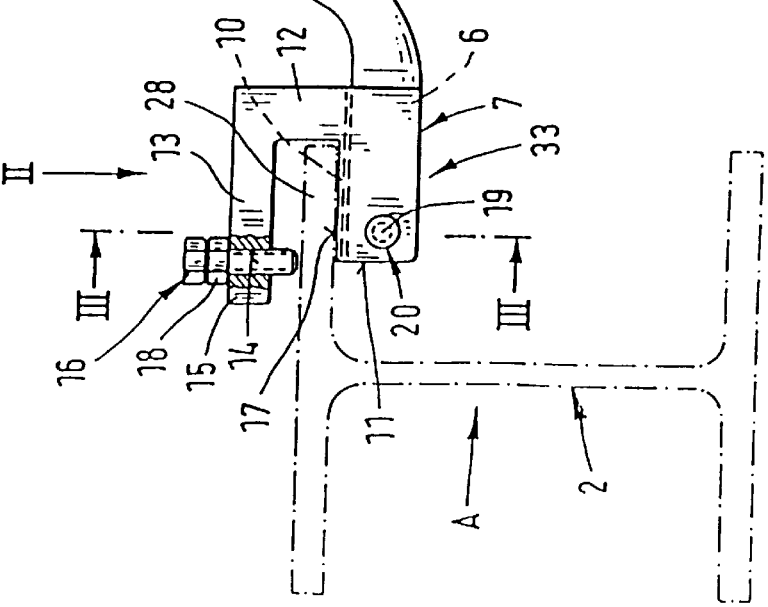

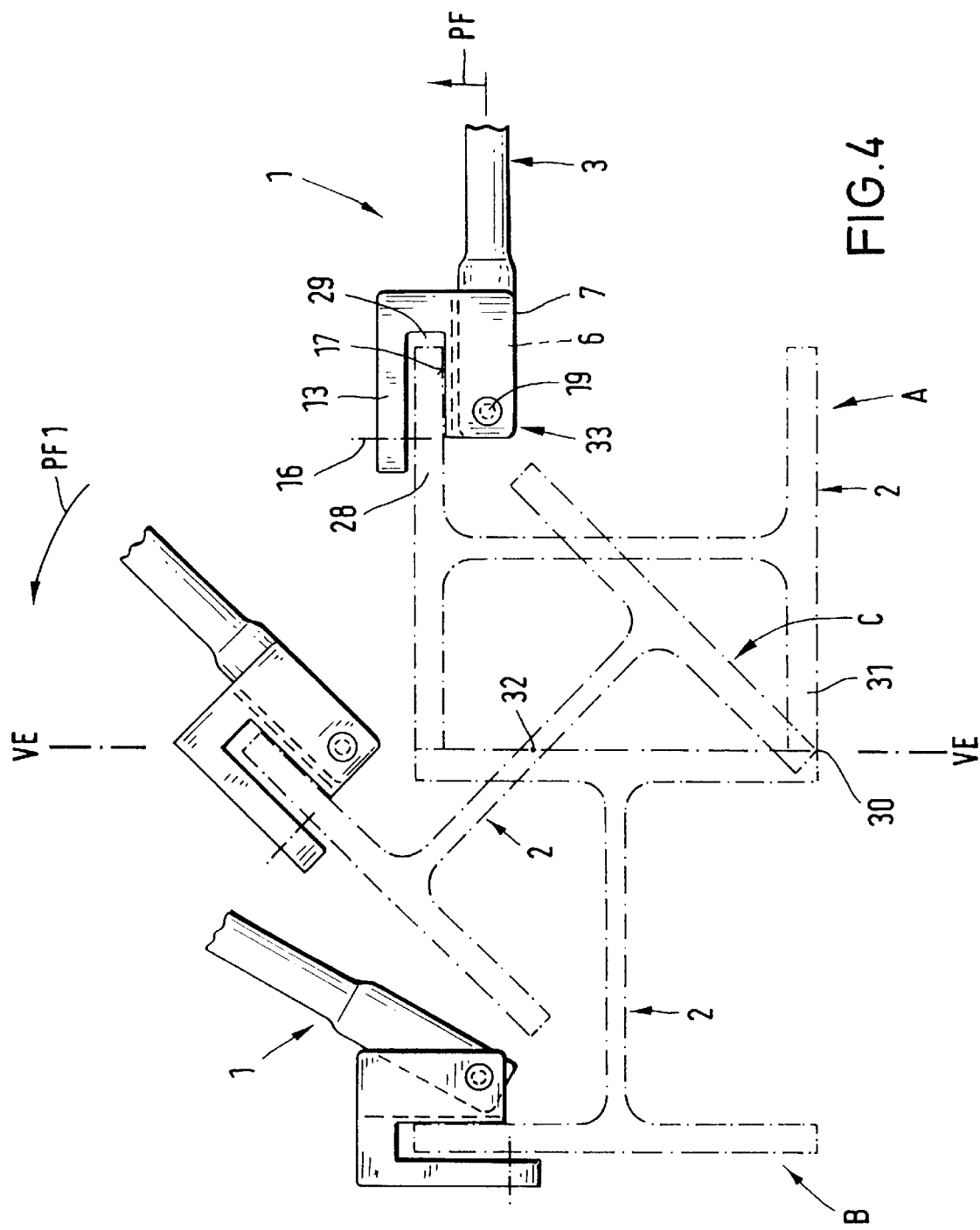

DEVICE FOR MANUALLY MOVING SECTIONS AND SHEET METAL

BACKGROUND OF THE INVENTION

1. Field of the Invention

The present invention relates to a device for manually displacing or moving sections and sheet metal.

2. Description of the Related Art

German Patent 44 29 631 C1 discloses a device for manipulating sections and sheet metal which includes a hand lever with a handle at one end of the hand lever and a fork-like or U-shaped claw attached to the hand lever through a swivel axis at a distance from the handle. The swivel axis is provided at the end of the hand lever facing away from the handle. The claw extends from the swivel axis in the direction toward the handle. The claw can be swivelled upwardly about the swivel axis relative to the hand lever over an angle of greater than 90° and the claw is secured against swivelling toward the bottom.

A device of this type has been found useful in actual practice. In use, the fork-like claw is placed from the side against the upper flange of a section or against a longitudinal edge of a piece of sheet metal. The claw is arranged relative to the lever end in such a way that, when an upwardly directed tensile force occurs which tends to swivel the section or sheet metal, no relative movement can take place between the claw and the hand lever as long as the axis of gravity of the respective object is not moved past the vertical plane extending through the tilt axis. A section or piece of sheet metal is securely held by the claw.

If, for example, the axis of gravity of a section is moved past the vertical plane extending through the longitudinal edge at the bottom of a bottom flange as the tilt axis, the claw can swivel about its swivel axis without swivelling the hand lever. During the further tilting procedure, the claw is automatically and without problems separated from the section. Consequently, an operator who still holds the handle of the hand lever is not pulled away by the tilting section and, thus, is not in danger of being injured. The same advantages exist when turning sheet metal. Moreover, damage to the spinal column of the operator due to incorrect body position during tilting or turning is essentially eliminated. Another advantage of the device is the fact that, when two or more operators are to tilt or turn an object together, one operator is no longer in danger of being injured as a result of inattention of another of the operators.

Even though the known device without doubt has the above-described advantages, it has been found in practice that the free swivelling capability of the claw relative to the hand lever frequently has the result that, prior to placing the claw against a section or a piece of sheet metal, the claw tilts downwardly and, consequently, the claw mouth is no longer in the desired position for grasping the section or piece of sheet metal. The operator must then hold the hand lever with one hand and pivot the claw with the other hand back into the position in which it can then be secured to the section or piece of sheet metal. Because of the unimpaired swivelling capability and, in the case of large section classes or heavier sheet metal, the heavier weight of the claw can then have the effect that an unintentionally swivelled claw may make contact with the shinbone of the operator and cause injury as a result. It is also possible that finger contusions may occur.

SUMMARY OF THE INVENTION

Therefore, it is the primary object of the present invention to provide a device for manually moving sections and sheet metal which can be ergonomically manipulated during daily handling while excluding the danger of injury.

In accordance with the present invention, the device for manually moving or displacing sections or sheet metal includes at least one hand lever which has at one end a handle and at the other end a gripping arm connected in an articulated joint to the hand lever so as to be capable of swivelling about a transverse axis. The hand lever further has an abutment located opposite the gripping arm. Frictionally engaging tensioning means for limiting the free swivelling capability of the gripping arm relative to the hand lever are integrated in the articulated joint between the gripping and the hand lever.

Accordingly, the present invention provides tensioning means in the articulated joint of the gripping arm with the hand lever, wherein the tensioning means are integrated in a frictionally engaging manner in such a way that, on the one hand, the gripping arm cannot swivel unintentionally about the transverse axis relative to the hand lever, while, on the other hand, the operator, by using the force of the hand available to him, can without problems displace the gripping arm into the respectively optimum gripping position in which the device can be placed against a section or a piece of sheet metal. In this manner, the device according to the present invention can be handled much more easily and the danger of injury due to an uncontrolled swivelling of the gripping arm is safely prevented.

Various types of frictionally acting tensioning means for limiting the free swivelling capability of the gripping arm relative to the hand lever are conceivable. For example, disk-like elastic tensioning means of rubber or synthetic material can be used. Spring rings of spring steel or serrated lock washers can also be used. Furthermore, it is possible to integrate helical compression springs in the articulated joint.

The present invention can advantageously be used in devices in which a gripping arm and an abutment are provided at one end of a hand lever. Such devices are usually used for tilting sections having wide flanges, for displacing such sections or also for displacing pieces of sheet metal.

For transporting and moving rail sections, frequently devices with two hand levers are used, also called rail tongs. The two hand levers are connected to each other through a transverse shaft. In that case, the gripping arm is arranged at one hand lever and the abutment is arranged at the other hand lever. After placing the gripping arm and abutment on a rail section, an upwardly directed pull force causes the gripping arm and abutment to be pressed against the rail section because of the crossed arrangement of the hand levers, so that the rail section can be carried without problems. Also in this type of device, because of the fact that the free capability of swivelling of the gripping arm relative to the abutment is limited by the frictionally acting tensioning means in the articulated joint between the gripping arm and the abutment, it is ensured that an uncontrolled relative displacement of one hand lever relative to the other hand lever is safely prevented. Any relative position of the two hand levers and, thus, of the gripping arm and abutment, is secured.

Each hand lever preferably is composed of a pipe. As a result, the weight is reduced while the resistance to bending is high. The pipe may be of simple structural steel. However, in order to optimize the hand lever even more, i.e., to provide the same load bearing capacity while having a lower weight, it is possible in accordance with the present invention to construct the hand lever of titanium or of duraluminum.

In accordance with an advantageous embodiment of the present invention, particularly for tilting sections and sheet metal, the articulated joint is composed of a U-shaped member which includes the abutment and can be swiveled by at least 90° relative to the hand lever, a plate-shaped member which forms one end of the hand lever and is received between the legs of the U-shaped member, a threaded bolt with head extending transversely and swivellably through an end of the plate-shaped member and screwed into a threaded bore at the end of one leg of the U-shaped member, and at least one disk spring placed between the plate-shaped member and the leg of the U-shaped member provided with the threaded bore.

Accordingly, in this embodiment, the end of the hand lever is flattened over a certain length to form the plate-shaped member which engages between the legs of the U-shaped member. Since the threaded bolt extends through the plate-shaped member so as to be swivellable, while engaging in a threaded bore of one of the legs of the U-shaped member, it is possible to provide at least one disk spring between the plate-shaped member and the leg with an exact pretension by appropriately turning the threaded bolt. Consequently, the operator is able to turn and secure the gripping arm together with the abutment relative to the hand lever in a manner which appears to be the best under the respective conditions at the work place. The use of a disk spring provides the significant advantage that the adjusted pretension remains essentially unchanged over a long period of time.

In accordance with another feature, at least one disk spring is also provided between the head of the threaded bolt and the plate-shaped member. As a result, disk springs are arranged on both sides of the plate-shaped member, wherein the threaded bolt extends through both disk springs.

In accordance with another feature of the present invention, the head of the threaded bolt is cylindrical and inserted and non-rotatably secured in a bore of the leg of the U-shaped member arranged opposite the leg with the threaded bore. After the operator has effected the desired frictional engagement between the gripping arm and the hand lever, he can attach the head of threaded bore by welding to the leg provided with the bore.

In accordance with a particularly advantageous feature, the plate-shaped member is formed by flattening the end of the hand lever composed of a pipe. As a result, it is not necessary to carry out welding operations. The pipe is flattened symmetrically relative to the longitudinal axis.

In accordance with another feature of the present invention, the abutment is formed on a web which connects the legs of the U-shaped member, wherein the web is connected at one end to the gripping arm extending parallel to the abutment in a U-shaped configuration through another gripping arm facing away from the articulated joint. This feature significantly simplifies the manufacture of the device. The gripping arm and the abutment can be punched or flame-cut from a sheet metal. The U-shaped member is preferably manufactured by a milling cutting operation. Consequently, the gripping arm and abutment can be manufactured without welding operations and the attendant disadvantages.

The distance between the gripping arm and the abutment may be specifically adapted to certain flange thicknesses of sections or to thicknesses of sheet metal. However, in accordance with another feature, a threaded bolt with a least one counternut are arranged in a threaded bore at the free end of the gripping arm, wherein the threaded bolt is adjustable in the direction toward the abutment. This makes it possible to manipulate with only one device several thicknesses of sections and sheet metal, for example, in a storage facility with different section and sheet metal thicknesses. The threaded bolt makes it possible to change the distance between the gripping arm and the abutment and the position of the threaded bolt can be secured by means of the counternut.

In accordance with a particularly advantageous embodiment of the present invention for manipulating rail sections, the articulated joint is formed by two plate-shaped members arranged at a distance next to each other which are components, on the one hand, of the gripping arm and, on the other hand, of the abutment. In addition, the embodiment includes a threaded bolt extending through the plate-shaped members coaxially with the transverse axis and at least one disk spring placed between the plate-shaped members, wherein the gripping arm and abutment are of identical construction in an F-shaped configuration and are attached at the ends of two L-shaped hand levers.

In this embodiment, the gripping arm as well as the abutment each have a plate-shaped member which extend diametrically offset at a distance next to each other. The free ends of the gripping arm and of the abutment have clamping arms for securing the ends to a rail section. The articulated joint of the two plate-shaped members again includes a threaded bolt in the transverse axis, wherein the threaded bolt is capable of tensioning at least one disk spring between the plate-shaped member in such a way that the two hand levers cannot be moved out of their relative position in an uncontrolled manner. This is a particular advantage especially because operators manipulating the device can no longer be injured at their fingers by a free capability of swivelling of the hand levers.

Since for the proper manipulation of this device, also called rail tongs, the hand levers are swivellably arranged in a crossed configuration in two parallel planes next to each other, another feature of the present invention provides that round stop bolts are attached, preferably welded, to the clamping arms of the gripping arm and the abutment. The clamping arms are each attached unilaterally to the stop bolts, however, a uniform contour still exists in the front view.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic side view of a device for tilting an I-shaped section;

FIG. 2 is a top view, on a larger scale, of the gripping arm of the device of FIG. 1, seen in the direction of arrow II.

FIG. 3 is a vertical sectional view taken along sectional line III—III of FIG. 1;

FIG. 4 is a schematic illustration of the various positions assumed by the device when tilting an I-shaped section;

DESCRIPTION OF THE PREFERRED EMBODIMENTS

Figure 5:
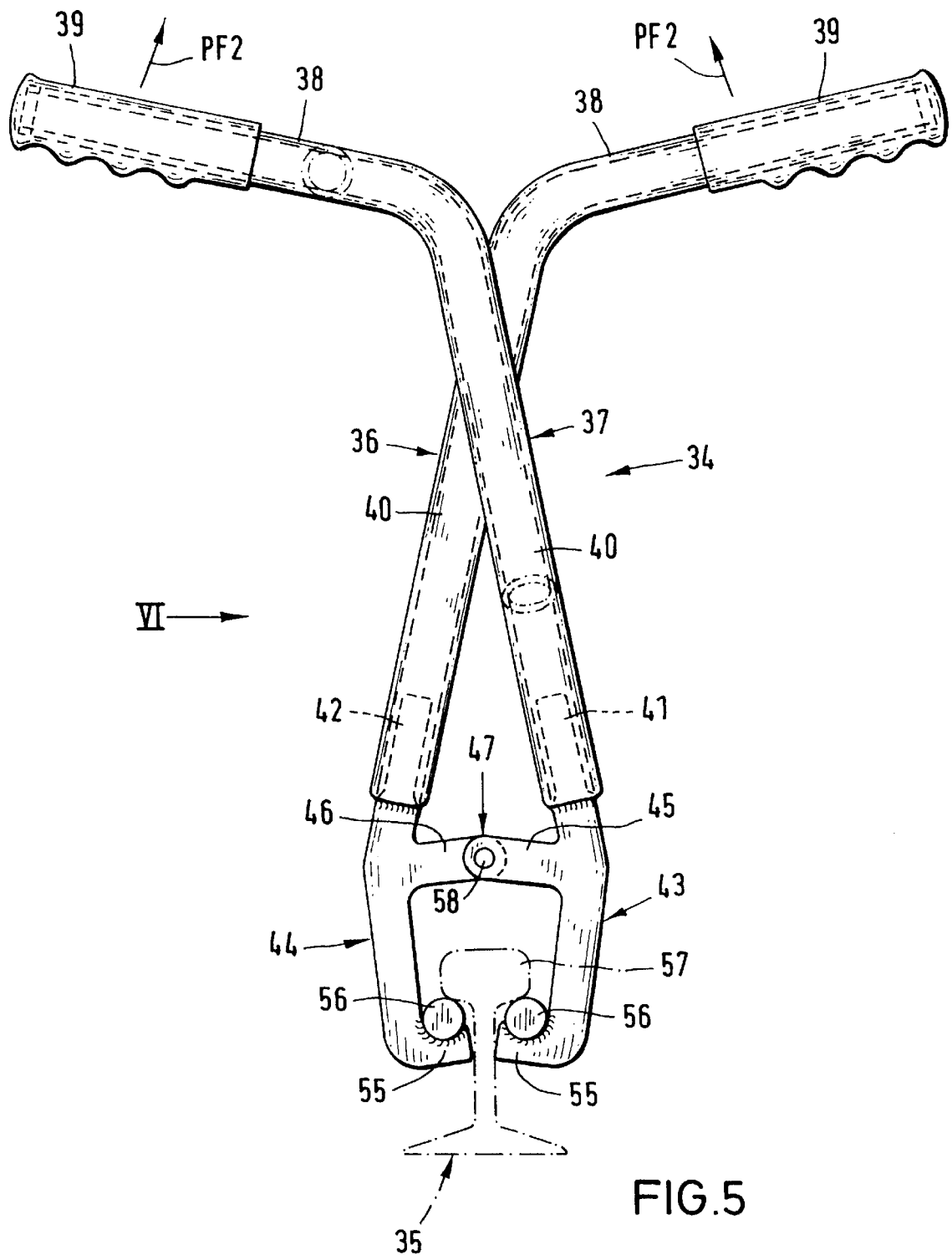
FIG. 5 is a front view of rail tongs placed on a rail section.

FIG. 1 of the drawing shows a device 1 for manually moving or displacing an I-shaped section 2. The device 1 includes a hand lever 3 composed of a pipe portion having a circular cross-section and bent into an S-shape. At the upper end portion 4 of the hand lever 3 as seen in the drawing, a handle 5 is attached, wherein the handle 5 has non-skid properties by an appropriate material selection and profiling. As can be seen in FIG. 3, the end portion of the hand lever 3 facing away from the handle 5 is flattened in order to form a plate-shaped member 6 which has an oval cross-section. The plate-shaped member 6 extends parallel to the end portion 4 provided with the handle 5.

The plate-shaped member 6 is received in a U-shaped member 7 having two legs 8, 9 extending parallel to each other and a web 10 connecting the legs 8, 9. The length of the U-shaped member 7 corresponds approximately to that of the plate-shaped member 6. At the end facing away from the end face 11 of the plate-shaped member 6, a gripping arm web 12 extending perpendicularly from the web 10 is provided, wherein the web 12, in turn, is connected to a gripping arm 13 extending parallel to the web 10. Gripping arm 13, gripping arm web 12 and U-shaped member 7 are constructed in one piece. The length of the gripping arm 13 corresponds approximately to the length of the U-shaped member 7, so that the gripping arm 13 protrudes beyond the end face 11 of the plate-shaped member 6.

A threaded bolt 16 is screwed into a threaded bore 14 at the free end 15 of the gripping arm 13. By displacing the threaded bolt 16, it is possible to adjust the distance between the gripping arm 13 and an abutment 17 forming an outer component of the web 10. The respectively displaced position of the threaded bolt 16 is secured by a counternut 18, as shown in FIGS. 1 through 3.

As can be seen from FIGS. 1 and 3, the U-shaped member 7 and the plate-shaped member 6 are connected to each other in an articulated manner. In other words, the gripping arm 13 can be swivelled together with the U-shaped member 7 about a transverse axis 19 by more than 90°. For this purpose, a threaded bolt 20 with a cylindrical head 21 extends in the transverse axis 19. The threaded bolt 20 extends through a transverse bore 22 in the plate-shaped member 6 and is screwed into a threaded bore 23 of the leg 8 of the U-shaped member 7. The cylindrical head 21 of the threaded bolt 20 is located in a throughbore 24 in the leg 9 of the U-shaped member 7. A disk spring 25 is provided between the plate-shaped member and the leg 8, wherein the threaded bolt 20 extends through the disk spring 25. Another disk spring 26 is arranged between the head 21 of the threaded bolt 20 and the plate-shaped member 6.

By appropriately pretensioning the disk springs 25 and 26 by means of the threaded bolt 20, it is now possible to limit the free capability of swivelling of the plate-shaped member 6 relative to the U-shaped member 7 by providing a certain frictional engagement. In this manner, the gripping arm 13 cannot freely swivel about the transverse axis 19. Rather, it is necessary to manually adjust the gripping arm 13 against the frictional force. After adjusting the desired frictional engagement, the head 21 of the threaded bolt 20 is welded to the leg 9 of the U-shaped member 7 provided with the throughbore 24.

When the section 2 is to be tilted from the position A shown in FIGS. 1 and 4 into the position B shown in FIG. 4, the U-shaped member 7 with the gripping arm 13 is initially manually swivelled about the transverse axis 19 in such a way that the plate-shaped member 6 and the opening 27 between the legs 8 and 9 of the U-shaped member 7 are aligned axially, as can be seen in FIGS. 1 and 4. The distance between the abutment 17 and the gripping arm 13 has previously been adjusted by means of the threaded bolt 16 and the counternut 18 to correspond to the thickness of the upper flange 28 of the section 2. In doing so, the distance of the end face of the threaded bolt 16 from the abutment 17 is dimensioned slightly greater than the thickness of the upper flange 28.

As shown in FIGS. 1 and 4, the device 1 is now placed on the upper flange 28 in such a way that the upper flange 28 is located in the receiving gap 29 between the gripping arm 13 and the abutment 17 (position A). By applying a force directed in the direction of arrow PF on the hand lever 3, the section 2 can now be tilted about the longitudinal edge 30 of the diagonally oppositely located bottom flange 31. Since the plate-shaped member 6 is engaged in the U-shaped member 7, the transverse axis 19 is located adjacent the end face 11 of the plate-shaped member 6, and the upper flange 28 is received in the receiving gap 29 between the abutment and the gripping arm 13, the upper flange 28 is securely grasped and the section 2 is tilted further about the longitudinal edge 30 of the bottom flange 31 in accordance with arrow PF1 (middle position C shown in FIG. 4).

Once the axis 32 of gravity of the section 2 has passed the vertical plane VE-VE extending through the longitudinal edge 30 of the bottom flange 31, the section 2 has because of its own weight the tendency to tilt further about the longitudinal edge 30 (position B in FIG. 4). When this occurs, the tensioning force of the disk springs 25, 26 is overcome, so that, due to this tilting movement and due to the articulated joint 33 of the gripping arm 13 with the plate-shaped member 6, the upper flange 28 can slide out of the receiving gap 29 between the gripping arm 13 and the abutment 17 if the operator who causes tilting of the section 2 continues to firmly hold the hand lever 3. Finally, the device 1 is completely separated from the section 2.

A straight hand lever can be used instead of the S-shaped hand lever 3.

FIGS. 5 to 8 of the drawing show a device 34 for manually moving or displacing a rail section 35. This device 34 is also called rail tongs. The device 34 includes two L-shaped hand levers 36 and 37 of pipe portions. The two hand levers 36 and 37 extend in two parallel planes E—E, E1—E1. The upper end portions 38 of the hand levers 36 and 37, as seen in the drawing, have skid-proof handles 39 provided with profilings. At these end portions 38, the hand levers 36 and 37 have a circular crosssection.

Figure 6:
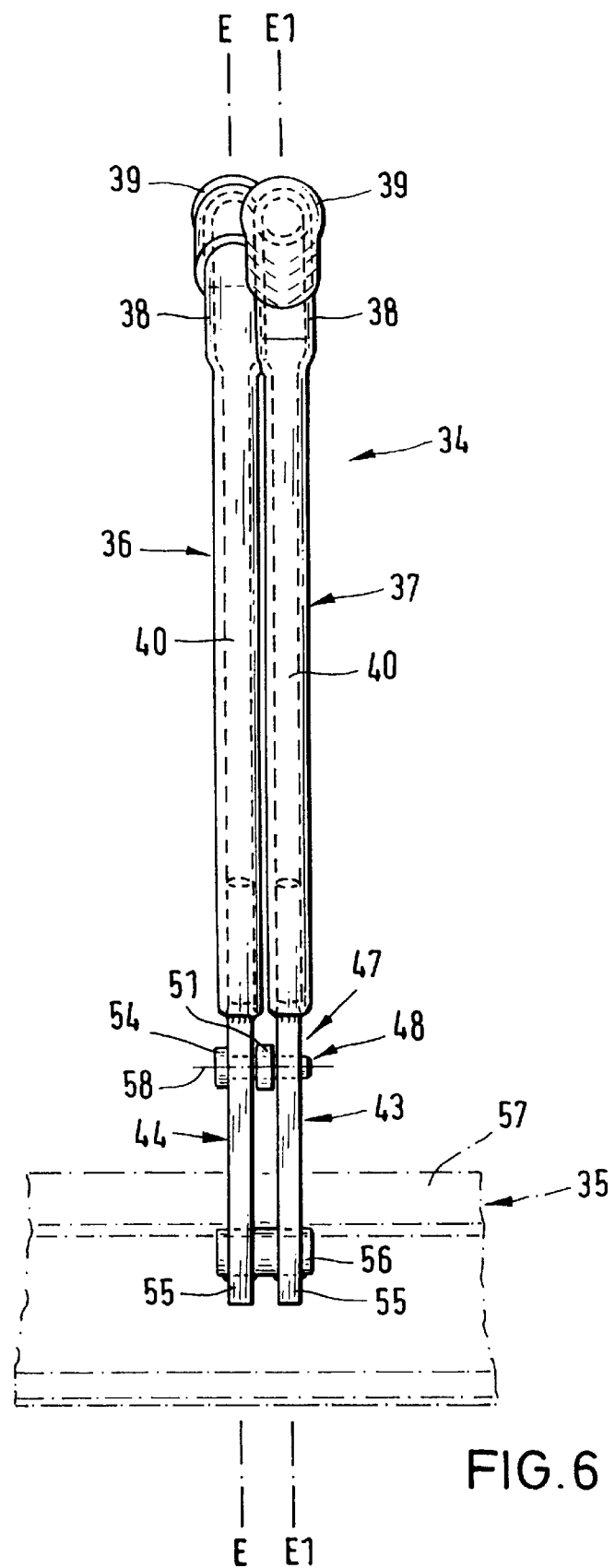
FIG. 6 is a side view seen in the direction of arrow VI of FIG. 5.
Figure 7:
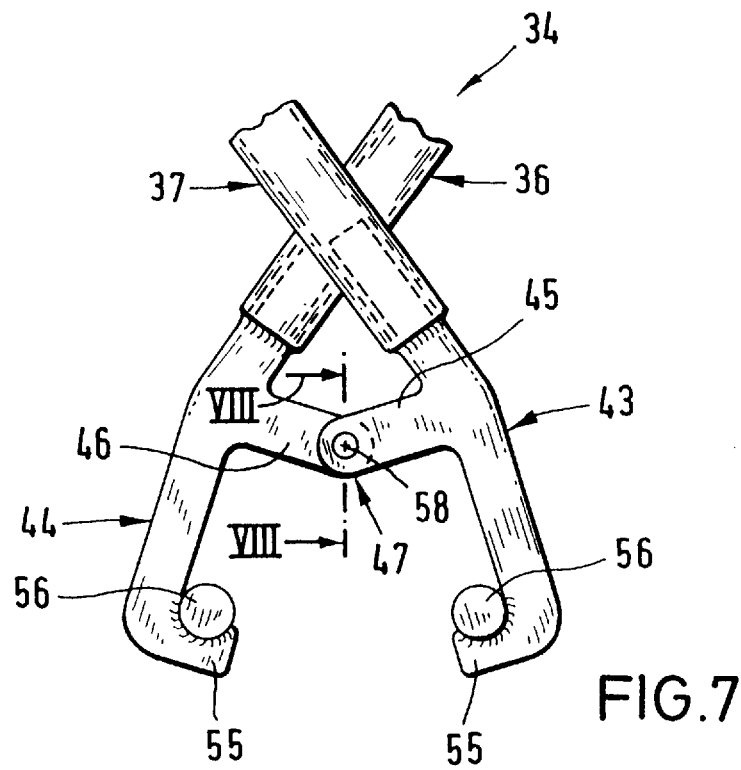
FIG. 7 shows the receiving area of the device of FIGS. 5 and 6 in the opened state.

At the length portions 40 which are directed downwardly as seen in FIGS. 5 and 6, the hand levers 36 and 37 are deformed into an oval shape, wherein the longer axes extend in the swivel planes E—E, E1—E1 of the hand levers 36, 37.

Flat pins 41, 42 of gripping arm 43 and an identically constructed F-shaped abutment 44 are inserted in and welded to the ends of the length portions 40 of the hand levers 36, 37.

Figure 8:
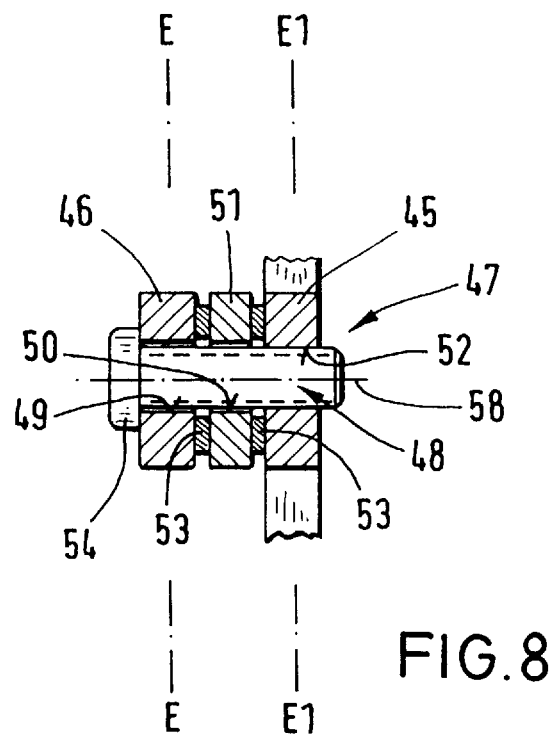
FIG. 8 is a cross-sectional view, on a larger scale, taken along sectional line VIII—VIII of FIG. 7.

The gripping arm 43 as well as the abutment 44 have plate-shaped members 45, 46 which extend next to each other at a distance in the planes E—E, E1—E1, as seen in FIGS. 5 to 8. The articulated joint 47 between gripping arm 43 and abutment 44 through these plate-shaped members 45, 46 further includes, as shown in FIG. 8, a threaded bolt 48 extending in a transverse axis 58, wherein the threaded bolt 48 extends through and is rotatable relative to the through-bores 49, 50 in the plate-shaped member 46 of the abutment 44 and an insert 51 between the two plate-shaped members 45, 46, and wherein the threaded bolt 48 is screwed into a threaded bore 52 of the plate-shaped member 45 of the gripping arm 43. Disk springs 53 are placed between the insert 51 and the plate-shaped members 45, 46, respectively, wherein the disk springs 53 can be pretensioned by means of the threaded bolt 48, so that the two hand levers 36, 37 can only be swivelled relative to each other by applying a manual force and overcoming the frictional engagement. After adjusting the pretensioning force of the disk springs 53, the head 54 of the threaded bolt 48 can be welded at the outside to the plate-shaped member 46.

The gripping arm 43 and the abutment 44 have at the ends thereof clamping arms 55 which are shorter than the plate-shaped members 45, 46. These clamping arms 55 are each welded to an end of a stop bolt 56 having a round cross-section. As can be seen particularly in FIGS. 5 and 6, the stop bolts 56 have the purpose of engaging under the rail head 57 of the rail section 35 and to make it possible in this manner to achieve a linear contact when forces directed in the direction of the arrows PF2 are applied to the handles 39 of the hand levers 36, 37.

While specific embodiments of the invention have been shown and described in detail to illustrate the inventive principles, it will be understood that the invention may be embodied otherwise without departing from such principles.

I claim:

1. A device for manually moving sections or sheet metal, the device comprising a hand lever comprised of a pipe having first and second ends, a handle being mounted on the first end, the second end being flattened to form a plate-shaped member, further comprising a gripping member connected in an articulated joint to the second end of the hand lever so as to be capable of swivelling about a transverse axis by at least 90° relative to the hand lever, the gripping member comprising a U-shaped member forming an abutment, the U-shaped member having legs receiving the plate-shaped member therebetween and a web connecting the legs, a threaded bolt extending transversely and swivelably through an opening in the end of the plate-shaped member, wherein the threaded bolt has a cylindrical head received in a bore at an end of one of the legs of the U-shaped member, and wherein the threaded bolt is inserted and non-rotatably secured in a bore at an end of another of the legs of the U-shaped member, further comprising a disk spring placed between the plate-shaped member and the leg of the U-shaped member with the threaded bore and another disk spring mounted between the head of the threaded bolt and the plate-shaped member, the gripping member further comprising a gripping arm extending parallel to the U-shaped member forming the abutment and a connecting member connecting the gripping arm and the U-shaped member, wherein the connecting member is located at the U-shaped member remote from the ends of the legs with the bores, the gripping arm having a free end with a threaded bore, another threaded bolt with at least one counternut being mounted in the threated bore at the free end of the gripping arm, wherein the another threaded bolt is adjustable toward the abutment.

* * * * *